United States Patent [19]
Parks

[11] 3,975,315
[45] Aug. 17, 1976

[54] EXPANDABLE RIGID VINYL CHLORIDE POLYMER COMPOSITIONS

[75] Inventor: Clarence E. Parks, Bay Village, Ohio

[73] Assignee: The B. F. Goodrich Company, Akron, Ohio

[22] Filed: Oct. 12, 1973

[21] Appl. No.: 405,884

Related U.S. Application Data

[63] Continuation-in-part of Ser. No. 226,260, Feb. 14, 1972, abandoned, and a continuation-in-part of Ser. No. 863,693, Oct. 3, 1969, abandoned.

[52] U.S. Cl. .......................... 260/2.5 R; 260/2.5 E; 260/2.5 HB; 260/890; 260/891; 260/898; 260/899
[51] Int. Cl.² ........................................... C08J 9/00
[58] Field of Search ........... 260/2.5 E, 2.5 HB, 891, 260/2.5 R, 899

[56] References Cited
UNITED STATES PATENTS

| | | | |
|---|---|---|---|
| 2,697,255 | 12/1954 | Lindemann | 260/2.5 P |
| 2,808,387 | 10/1957 | Parks et al. | 260/891 |
| 2,849,028 | 8/1958 | Clark | 260/2.5 P |
| 2,964,799 | 12/1960 | Roggi et al. | 260/2.5 P |
| 3,261,785 | 7/1966 | Robinson | 260/899 |
| 3,290,262 | 12/1966 | Leclercq | 260/2.5 P |
| 3,293,094 | 12/1966 | Narin et al. | 260/2.5 P |
| 3,308,074 | 3/1967 | Landler | 260/2.5 P |
| 3,440,309 | 4/1969 | Brewkink | 260/2.5 E |
| 3,706,679 | 12/1972 | Hopton et al. | 260/899 |

*Primary Examiner*—Richard B. Turer
*Attorney, Agent, or Firm*—J. Hughes Powell, Jr.

[57] ABSTRACT

Extruded expanded substantially gel and cross-link free rigid vinyl chloride polymer articles are prepared from mixtures of high molecular weight vinyl chloride polymers and copolymers of a styrene and an acrylonitrile or alkyl methacrylate, optionally with a polymer of butadiene, styrene and acrylonitrile, and a blowing agent, without the use of plasticizers, solvents or cross-linking agents. In extruding these compositions, sized pipe, bottles, boards and the like are readily prepared having fine, uniform, cell structure, hot strength, and specific gravities from about 0.38 to 0.95.

16 Claims, No Drawings

EXPANDABLE RIGID VINYL CHLORIDE POLYMER COMPOSITIONS

CROSS REFERENCE TO RELATED APPLICATIONS

This is a continuation-in-part of copending application Ser. No. 226,260 filed Feb. 14, 1972 now abandoned, a continuation-in-part of application Ser. No. 863,693 filed Oct. 3, 1969, now abandoned.

BACKGROUND OF THE INVENTION

Foamed polyvinyl chloride compositions obtained by use of a chemical blowing agent in plasticized polyvinyl chloride compositions are described in U.S. Pat. No. 3,432,452; volatile solvents having a plasticizing action on polyvinyl chloride in making cellular compositions is described in U.S. Pat. No. 2,737,503; in U.S. Pat. No. 2,901,466 a hydrocarbon or halogenated hydrocarbon solvent is used in place of a plasticizer; and in U.S. Pat. No. 3,261,785 where polyvinyl chloride is cross-linked with a polysulfonazide cross-linking agent which may be used to make foams thereof whereby the cross-linking must occur before the foam collapses. Another technique for providing molded cellular polyvinyl chloride using a polyisocyanate and blowing agent is described in U.S. Pat. No. 3,200,089.

The procedures and formulations of the prior art have not been satisfactorily applied to form extruded expanded rigid vinyl chloride plastics with the desired balance of processing and physical properties. For rigid extrusions plasticizers are not desired and solvents introduce handling and processing problems. Extruded expanded products produced in accordance with known methods often have large non-uniform cell structure and density has been difficult to control. Further, the prior art formulations would not form low specific gravity products having enough hot strength for extrusion processes nor for pulling through sizing equipment. For applications where profile extrusion must be uniformly sized, such formulations have not been satisfactorily used.

SUMMARY OF THE INVENTION

It has now been found that through the use of 5 to 20 weight parts, per 100 weight parts of a vinyl chloride polymer, of a copolymer of a styrene containing about 10 to 40% of a bound acrylonitrile or 25 to 75% of an alkyl, alkyl-substituted acrylate, or both, that vinyl chloride polymers may be expanded with a nitrogen releasing chemical compound blowing agent without using solvents or liquids including volatile liquids to form substantially gel-free expanded materials having substantially uniform cells and the necessary cell wall strength at high temperatures so that at the end of the die, extrusions have sufficient hot strength so that the extrusions may be sized and pulled without breaking. In order to achieve these advantages it is essential that the styrene polymer have a dilute solution viscosity greater than about 1.5. The compounds are substantially free of plasticizers and solvents.

Further improvements in these expanded vinyl chloride polymer compositions are obtained by including 5 to 20 weight parts, per 100 weight parts of a vinyl chloride polymer, of a polymer of butadiene-1,3, styrene and acrylonitrile or alkyl methacrylate, containing about 50 to 80 parts of butadiene, 10 to 40 parts of a styrene and 10 to 40 parts of an acrylonitrile or alkyl methacrylate. Mixtures of the vinyl chloride polymer, styrene copolymer and a polymer of butadiene, styrene and acrylonitrile, when mixed with the chemical blowing agent are readily extruded in commercial extruders and sized to form rigid expanded vinyl chloride extrusions that do not lose gas, have densities in the range from about 0.38 to 0.95, have sufficient hot strength to be sized and form profiles as in the formation of bottles, pipe, board, moldings and the like.

Additional improvements in extrusions, having enhanced hot dimensional stability and reduced shrinkage on cooling are obtained by use of mixtures of vinyl chloride polymers containing some high molecular weight polymers or vinyl chloride polymers mixed with chlorinated vinyl chloride polymers.

DETAILED DESCRIPTION

The vinyl halide polymers which are utilized in preparing the compositions of this invention include all of the normally rigid, hard, tough polymeric materials comprised predominantly of polymerized vinyl halide, that is, homopolymers of the vinyl halides such as polyvinyl chloride, polyvinyl fluoride and polyvinyl bromide, as well as copolymers containing greater than 50% of bound vinyl halide and lesser amounts of other monoolefinic monomers.

Multi-component interpolymers made from monomer mixtures containing predominantly a vinyl halide monomer and minor amounts of one or more other copolymerizable monoolefinic monomers may also be employed so long as they are normally rigid copolymers. Such other copolymerizable monoolefinic monomers which may be interpolymerized with the vinyl halides include vinylidene halides such as vinylidene chloride; vinyl esters such as vinyl acetate, vinyl butyrate, vinyl benzoate and the like; acrylic and α-alkyl acrylic acids, their alkyl esters, amides and nitriles such as acrylic acid, ethacrylic acid, ethyl acrylate, octyl acrylate, methyl methacrylate, butyl ethacrylate, acrylamide, acrylonitrile and the like; vinyl aromatic compounds such as the styrenes including styrene, chlorostyrene, ethyl styrene and the like; vinyl naphthalene; alkyl esters of maleic and fumaric acid such as diethyl maleate; vinyl alkyl ethers and vinyl alkyl ketones; vinyl pyridine; isobutylene and various other copolymerizable monoolefinic monomers; especially those containing the $CH_2\!\!=\!\!C\!<$ group.

The vinyl halide polymer preferably employed is polyvinyl chloride or vinyl chloride copolymers which contain only minor proportions of other copolymerized monoolefinic monomers such as copolymers of preferably 70 to 99% of vinyl chloride and, for example, about 1 to 30% of vinylidene chloride, vinyl esters and acrylic acid esters; or multi-component interpolymers such as those, for example, containing about 70 to 90% vinyl chloride, 5 to 25% vinylidene chloride, and 5 to 25% vinyl esters such as vinyl acetate, vinyl benzoate, and alkyl acrylates or alkyl methacrylates. Regardless of the particular comonomers employed, the end products of this invention are preferably obtained by employing a normally rigid vinyl halide polymer having a specific viscosity of greater than 0.40 measured as a .4% solution in nitrobenzene.

The vinyl halide polymers may be prepared by any of the polymerization techniques known to and employed by those skilled in the art. Such methods as solution, suspension, emulsion and the like are preferred. The polyvinyl chloride preferred for this use is preferably a hard, tough, high-molecular weight material of uniform molecular weight distribution and particle size, so as to take advantage of all of the excellent properties inherent in this material.

The styrene copolymers are prepared by polymerizing a monomeric mixture consisting essentially of a styrene and an acrylonitrile and/or alkyl alkyl-substituted acrylate. Such mixtures may also contain minor amounts of other copolymerizable monoolefinic monomers of the type hereinbefore described as minor constituents. The styrene utilized is preferably styrene itself. Other useful styrenes include alkyl styrenes, especially α-methyl styrene, vinyl toluene, ethyl styrene; halo-sytrenes such as chlorostyrenes represented by monochlorostyrene and dichlorostyrenes; alkoxy styrenes and like styrene derivatives copolymerizable with acrylonitrile. Better results are obtained if the resin contains greater than 50% of bound styrene or is prepared from monomer mixtures containing greater than 50 weight percent of styrene. The acrylonitrile comonomer employed in the monomer mixture is preferably acrylonitrile. Other useful acrylonitriles include alkyl acrylonitriles such as methacrylonitrile and ethacrylonitrile, chloroacrylonitrile and the like, in amounts from 10 to 40% in the monomer mixture and resulting copolymer. The other minor monoolefinic constituents, if employed, are preferably less than 20%. It is preferred to use, however, polymers prepared from monomer mixtures containing about 60 to 90 weight percent of styrene and 10 to 40 weight percent of acrylonitrile, more preferably 15 to 35%. In any case the styrene polymer should be a hard, tough, high-molecular weight thermoplastic material with a dilute solution viscosity greater than 1.5, preferably greater than 2.5, to obtain optimum results from its use with the other components of the composition.

The styrene copolymer may also contain an alkyl methacrylate or ethacrylate in addition to, or in place of, the nitrile in amounts from 5 to 75%, preferably 40 to 60%. Particularly useful are methyl methacrylate and ethyl methacrylate. Other alkyl methacrylates may be employed.

The styrene copolymers may be prepared by any of the polymerization techniques known to and employed by those skilled in the art. Such methods as solution, suspension, emulsion and the like are preferred. The amounts of styrene copolymer employed in the compositions of this invention are from 5 to 20 weight parts per 100 weight parts of polyvinyl halide. Better results are obtained when using 7.5 to 15 parts per 100 weight parts of the vinyl halide polymer.

The other interpolymers employed in the preparation of the polymer compositions of this invention contain a butadiene-1,3 hydrocarbon, an acrylonitrile and at least one other monoolefinic monomer copolymerizable with the butadiene-1,3 hydrocarbon and acrylonitrile. The interpolymers may be prepared by polymerizing monomer mixtures containing preferably 1,3-butadiene, acrylonitrile and one or more of a styrene, alkyl acrylates, alkyl methacrylates and like monoolefinic comonomers. The monoolefinic comonomers that may be copolymerized with a butadiene-1,3 hydrocarbon and acrylonitrile are well known to those skilled in the art and include such materials as preferably styrene, chlorostryene, α-methyl styrene and the like, and also include the alkyl acrylates such as ethyl acrylate, butyl acrylate, hexyl acrylate; alkyl methacrylates such as methyl methacrylate, butyl methacrylate, octyl methacrylate; vinyl alkyl ketones such as vinyl methyl ketone; vinyl alkyl ethers such as vinyl ethyl ether, vinyl pyridine, vinyl naphthalene and the like. In general, the third monomeric constituent may be a vinylidene compound containing the group $CH_2=C<$, that is, containing a terminal methylene group attached by a double bond to a carbon atom. Other butadiene-1,3 hydrocarbons such as isoprene, and other acrylonitriles such as methacrylonitrile, chloroacrylonitrile and the like may also be employed.

The ratio of the monomers by weight employed may be from about 50 to 80% butadiene-1,3 hydrocarbon, 10 to 40 weight percent of the acrylonitrile, and 10 to 40 weight percent of the other copolymerizable monoolefinic monomers. It is preferred that only three component monomer mixtures be polymerized for the interpolymers to be used in this invention, but small amounts of other copolymerizable monoolefinic monomers as set forth above may be present in the monomer mixture. Better results are obtained when the interpolymer used is prepared from monomers in amount from 60 to 75 weight percent of butadiene-1,3, from 10 to 20 weight percent acrylonitrile, and 10 to 20 weight percent of another monoolefinic monomer copolymerizable with the butadiene-1,3 hydrocarbon and an acrylonitrile selected from the group consisting of styrenes, alkyl acrylates and alkyl methacrylates. A useful interpolymer is prepared from a monomer mixture containing 60 to 70 weight percent butadiene-1,3, 15 to 20 weight percent acrylonitrile and 15 to 20 weight percent styrene. Methyl methacrylate may be substituted for part of the styrene and acrylonitrile.

The interpolymer of butadiene, styrene and acrylonitrile may also be prepared by the well known over- or graft-polymerization techniques. For example, to poly(butadiene) latex there is added additional catalyst and emulsifier if necessary and styrene and acrylonitrile and/or an alkyl methacrylate in amounts from about 50 to 85 poly(butadiene) and from about 15 to 50 of styrene, acrylonitrile or methyl methacrylate in ratios of about 10 to 40 styrene and 10 to 30 acrylonitrile or 10 to 40 alkyl methacrylate. Instead of poly(butadiene), butadiene copolymers containing up to about 40% styrene and/or acrylonitrile, methyl methacrylate, vinylidiene chloride or other copolymerizable vinylidene compounds may be employed.

The interpolymers may be prepared by any of the polymerization techniques known to and employed by those skilled in the art, but emulsion polymerization is preferred. The interpolymer may be employed as the dry solid polymer, as a cement, dispersion, a latex and the like, and at any reasonable degree of conversion, although a conversion between 50 and 100 percent is preferred. The interpolymer is normally polymerized to a Mooney value of about 25 to 150 ML.

The amount of interpolymer to be blended with the other ingredients to obtain the outstanding compositions of this invention may be varied within rather broad limits, and one is still able to obtain useful products; but if the advantages of the vinyl halide polymer are to be maintained, the amounts employed to obtain optimum results are rather critical. From 5 to 20 weight parts of interpolymer are preferably used per 100 parts of vinyl halide polymer. Better results are obtained if 7.5 to 15 parts are employed per 100 weight parts of vinyl halide polymer.

In the practice of this invention the ingredients may be mixed in any order and the ingredients may be in any conventional form. One preferred method is to blend powders of the resins. The powder blend may be used as such or pelletized. The ingredients also may be granulated.

The blowing agent is used in amounts from about 0.1 to 2 weight parts per 100 weight parts of vinyl chloride polymer, preferably about 0.2 to less than 1.5. Expanded unplasticized polyvinyl chloride compositions having densities of about 0.7 to 0.8 have been obtained with 0.2 to 0.3 weight parts of chemical blowing agent and expanded unplasticized polyvinyl chloride compositions having densities of about 0.56 have been made with about 0.8 weight part of blowing agent. A variety of chemical blowing agents are satisfactory in obtaining the expanded vinyl chloride polymers of this invention. The nitrogen releasing agent, for example, including azobisformamide, azobisisobutyronitrile, diazoaminobenzene, p,p′-oxybis-(benzenesulfonylhydrazide), N,N′-dinitroso-pentamethylenetetraamine, p,p′-azobis-(benzenesulfonylsemicarbonamide), diethylazoisobutyrate, 1,3-bis-(xenyl)triazine, 4,4′-oxybis-(benzenesulfonylhydrazide) and the like have been found to be useful. These generally are azo-, N-nitroso- and sulfonyl hydrazide compounds.

Catalysts based on lead, barium, cadmium, zinc salts and the like may be used. These catalysts are activators and generally lower the temperatures of gas release of the blowing agent. Excellent results have been obtained with blowing agents releasing gas at a temperature above 300°F., particularly above 350°F.

Lubricants and lubricant mixtures may be included in the compounds in amounts from about 1 to 5, preferably 2 to 4, weight parts including for example, paraffin, polyethylene, calcium stearate, ethylenebis stearylamide and other lubricants known to and used by those skilled in the art. High melting point lubricants, above 250°F. are preferred. Amide waxes and metal salts of fatty acids are of this type.

Fine particle size inorganic fillers may also be included in amounts from about 1 to 15 weight parts including for example titanium dioxide, iron oxide, calcium carbonate, silicas and the like.

Group IIA metal oxides and hydroxides particularly calcium and magnesium oxide and hydroxide have been employed in amounts from about 0.1 to 5 weight parts. Any of the usual color pigments may be added to obtain desirable color in the rigid expanded articles.

Stabilizers known to those skilled in the art as the tin stabilizers, particularly the tin mercaptides, for example, dibutyltinthioethyldiglycolate and the lauryl derivative have been found useful in amounts from about 0.5 to 4 parts. Some synergism with the blowing agent has been observed with these materials. As is obvious the invention is practiced without substantial amounts of plasticizers and solvents.

The rigid expanded vinyl chloride polymer compositions and articles of this invention are substantially free of crosslinks or gel. For a bench mark, the extruded expanded materials contain less than 10% gel and normally have 0% gel. They are thus soluble in tetrahydrofuran, and chlorobenzene at 80°C. Because of the critical dimension of many expanded articles in the extrusion expansion vinyl chloride polymer art, there is more than the usual amount of scrap accumulating which one must be able to reuse by, for example, grinding, recompounding and reextruding. Gelled, cross-linked polymer compositions and articles cannot be successfully reextruded and expanded to form useful articles since the materials are nonthermoplastic after cross-linking. Further, compositions which provide gel-free articles are more readily extruded, sized and shaped to critical dimensions. Using the defined compositions, one does not experience any foam collapse in the absence of cross-linking. Obviously, the extrusion expansions of this invention are obtained from compounds being substantially free of cross-linking or gelling agents so that the expanded products have none or very low amounts of gel, for example, less than 5%.

In an embodiment of the invention, a powder mixture is made of the following ingredients: 100 weight parts of polyvinyl chloride having a specific viscosity of 0.54; 10 parts of a copolymer of 70% styrene and 30% acrylonitrile having a dilute solution viscosity of 3; 15 weight parts of a polymer prepared by polymerizing 37.5 parts of styrene and 12.5 parts acrylonitrile on 50 parts of poly(butadiene-1,3), 0.8 part of 1,1′-azobisformamide, 2.5 parts of dibutyltinthiooctylglycolate, 1.5 parts of calcium stearate, 1.0 part of titanium dioxide, 0.13 part of magnesium oxide, 2.0 parts of ethylenediamine bisdistearate and 2 parts of iron oxide. This powder mix was fed by a screw into an extruder having a pipe die 1″ in diameter, extruded at a stock temperature of 400°–410°F. and pulled through a cooling zone, a metal sizer and then through a water bath. The resulting expanded pipe has a uniform cell structure and a density of 0.65.

This embodiment was repeated without the polymer of butadiene, styrene and acrylonitrile. The resulting rigid expanded extrusion had sufficient hot strength to be pulled and sized, a higher density, less impact resistance than that of the extrusions made from the compound containing the polymer of butadiene, styrene and acrylonitrile.

Another powder mixture was prepared using 100 weight parts of polyvinyl chloride having a specific viscosity of 0.54, 7.5 weight parts of a copolymer of styrene and acrylonitrile containing 30% acrylonitrile and having a dilute solution viscosity in 1% monochlorobenzene solution of 3.1, 10 weight parts of a polymer containing 68% butadiene, 16% styrene and 16% acrylonitrile, 3 parts of tin mercaptide stabilizer, 0.8 weight part of azobisformamide, 2 weight parts of calcium stearate, 1 weight part of titanium dioxide, 0.1 weight part of magnesium oxide and 2 weight parts of iron oxide. The powder mix was fed into an extruder and extruded through a die in the form of an angular wood molding at a stock temperature of about 400°F. and pulled through a sizer and water bath. The resulting extrusion had a density of 0.6, tensile strength in the range of about 2400–2700 psi, heat distortion temperature of about 65°C., Izod impact 0.6–0.7, coefficient of thermal expansion $75 \times 10^{-6}$/°C. and thermal conductivity of $2.101 \times 10^{-4}$ calories/cm/sec/°C. The extruded stock may be sawed and nailed without splitting and has use as a substitute for wood moldings used in interior trim in house construction.

These extrusions are subject to stretching while passing through a sizer. Similar compounds prepared with styrene-acrylonitrile copolymers having dilute solution viscosities of less than 1.5 continually stretched and broke and were unsatisfactory in continuous runs of the extrusions since they did not have the requisite hot strength, even when 20 parts of these styrene-acrylonitrile copolymers were used.

A further improvement in obtaining extrusions when accurate reproducible dimensions are required is obtained by using 50 to 90 weight parts of commercial vinyl chloride polymers that normally have specific viscosities in the range of about 0.45 to 0.55, 10 to 50 weight parts of polyvinyl chloride having a specific viscosity of 0.6 and greater, as 0.7 to 0.8, and/or chlorinated polyvinyl chloride having a density in the range of 1.43 to 1.65. By means of the addition of these higher specific viscosity vinyl chloride polymers and/or chlorinated vinyl chloride polymer, it was found quite unexpectedly that the extrusions held their hot shape better, and reduced shrinkage and change in dimensions was obtained on cooling, particularly after the extrusions were sized. The preparation and properties of chlorinated polyvinyl chloride are described in U.S. Pat. No. 2,996,489. Excellent results are obtained with chlorinated polyvinyl chloride having densities from about 1.53–1.59 and containing 64–68% by weight of chlorine.

To demonstrate these improvements, a mixture was made from 70 weight parts of polyvinyl chloride, specific viscosity of 0.54, 30 weight parts of polyvinyl chloride having a specific viscosity of 0.7, 10 weight parts of a copolymer containing 70% styrene and 30% acrylonitrile and having a dilute solution viscosity of 3, 10 weight parts of an elastomeric copolymer containing 67% butadiene-1,3, 18% styrene and 15% acrylonitrile, 3 weight parts of tin mercaptide stabilizer, 0.8 weight part of azobisformamide, 1.5 weight parts calcium stearate, 2 weight parts of ethylenediamine bis-stearylamide, 1 weight part of titanium dioxide and 0.125 weight part of magnesium oxide. This mix was fed into an extruder and extruded through a die in the form of a 45° angular extrusion of about ⅝ inch thickness at a stock temperature of about 400°F., pulled through a sizer and water bath. This extrusion maintained its hot shape before sizing and did not shrink or change in dimension on cooling after sizing and had no tendency to curl. The resulting extrusions had a density of 0.6.

This compound was repeated with 30 weight parts of chlorinated polyvinyl chloride having chlorine content of 66.73% and a density of 1.560 grams/cc used instead of the high viscosity polyvinyl chloride. When this mix was extruded and size, improvement in surface appearance, less shrinkage on cooling and holding of hot shape while sizing and cooling was observed as compared to examples containing 100% of polyvinyl chloride having a specific viscosity of about 0.5. By means of these improved compositions, extrusions may be sized to accurate reproducible predetermined dimensions.

I claim:

1. An expandable composition adapted to form substantially gel-free extruded expanded vinyl chloride polymer articles having densities in the range from about 0.38 to about 0.95, substantially free of plasticizers, volatile liquids and solvents comprising (1) a vinyl chloride polymer in amounts of about 50 to 90 weight percent having a specific viscosity of less than 0.6 and 10 to 50 weight percent of polyvinyl chloride having a specific viscosity of greater than 0.6 or a chlorinated polyvinyl chloride, (2) about 5 to 20 weight parts, based on 100 weight parts of (1) of a polymer of a styrene containing more than 25% of styrene and at least one comonomer selected from the group consisting of an acrylonitrile and an alkyl alkacrylate, said styrene copolymer having a dilute solution viscosity greater than 1.5, and a blowing agent consisting essentially of nitrogen releasing chemical blowing agents.

2. The composition of claim 1 wherein the vinyl chloride polymer is polyvinyl chloride, the copolymer of styrene contains 15 to 35% acrylonitrile and there is 0.1 to about 1.5 weight parts of a chemical blowing agent per 100 weight parts of polyvinyl chloride.

3. A composition of claim 2 containing (3) about 5 to 15 parts of a polymer of butadiene-1,3, and at least two monomers selected from the group consisting of a styrene, an acrylonitrile and an alkyl methacrylate, said polymer containing about 50 to 80% of butadiene-1,3.

4. A composition of claim 3 wherein the styrene copolymer (2) contains 15 to 35% acrylonitrile and has a dilute solution viscosity of greater than 2.5, and the butadiene polymer (3) contains about 10 to 30% of acrylonitrile and 10 to 40% styrene and the amount of blowing agent is from 0.2 to 1.0.

5. A composition of claim 3 wherein the polymer (3) comprises a styrene and an acrylonitrile overpolymerized on poly(butadiene-1,3) in amounts of 50 to 15 parts of poly(butadiene-1,3) and 85 to 50 parts of styrene and acrylonitrile in ratios of about 3:1 to 1:1 of styrene to acrylonitrile.

6. The composition of claim 1 wherein the styrene copolymer (2) is a copolymer of styrene and methyl methacrylate containing 40 to 60% methyl methacrylate.

7. The composition of claim 3 wherein the chemical blowing agent is azobisformamide and the composition also contains 1 to 5 parts of lubricant having a melting point greater than 250°F. and a tin mercaptide.

8. A composition of claim 4 wherein the copolymer of styrene contains about 30% acrylonitrile and has a dilute solution viscosity of about 3 present in amounts of about 7.5 to 12.5 weight parts per 100 weight parts of polyvinyl chloride, about 7.5 to 12.5 weight parts per 100 weight parts of polyvinyl chloride of an elastomeric polymer containing between 60 and 70% butadiene, 10 to 20% sytrene, 10 to 20% acrylonitrile, 0.5 to 1.25 weight parts of azobisformamide.

9. The composition of claim 8 wherein the vinyl chloride polymers comprise a mixture of 60 to 80 weight percent of polyvinyl chloride having a specific viscosity between 0.45 and 0.55 and 20 to 40 weight parts of polyvinyl chloride having a specific viscosity between 0.65 and 0.75.

10. The composition of claim 8 wherein the vinyl chloride polymers comprise from 60 to 80 weight parts of polyvinyl chloride having a specific viscosity between about 0.45 and 0.55 and 10 to 40 weight parts of chlorinated polyvinyl chloride containing about 64 to 68% by weight of chlorine.

11. A rigid expanded vinyl chloride polymer composition substantially free of gel, plasticizers and solvents comprising (1) a vinyl chloride polymer in amounts of about 50 to 90 weight percent having a specific viscosity of less than 0.6 and 10 to 50 weight percent of polyvinyl chloride having a specific viscosity of greater than 0.6 or a chlorinated polyvinyl chloride, (2) 5 to 20 weight parts, per 100 weight parts of vinyl chloride polymer, of a copolymer of styrene containing more than 25% styrene and at least one monomer selected from the group consisting of acrylonitrile and an alkyl methacrylate, said styrene copolymer having a dilute solution viscosity greater than 1.5, said composition having a density from about 0.38 to 0.95.

12. A rigid expanded vinyl chloride polymer of claim 1 containing less than 10% gel wherein the (2) polymer of styrene contains 15 to 35% acrylonitrile and the composition also contains (3) 5 to 15 weight parts, based on 100 weight parts of (1), of a polymer of butadiene-1,3, a styrene and at least one of acrylonitrile and alkyl methacrylate in amounts of about 50 to 80% butadiene, 10 to 40% of a styrene and 10 to 30% of an acrylonitrile or an alkyl methacrylate.

13. The composition of claim 12 wherein the styrene copolymer contains about 30% acrylonitrile and has a dilute solution viscosity of about 3 in amount of about 7.5 to 12.5 parts per 100 weight parts of polyvinyl chloride, and there is about 7.5 to 12.5 weight parts per 100 weight parts of polyvinyl chloride of an elastomer containing 60 to 70% butadiene-1,3, 10 to 20% styrene and 10 to 20% acrylonitrile, and 0.2 to 1 part of azobisformamide.

14. The composition of claim 13 wherein the vinyl chloride polymers comprise 60 to 80 weight parts of polyvinyl chloride having a specific viscosity between 0.45 and 0.55 and 20 to 40 weight parts of at least one of polyvinyl chloride having a specific viscosity between about 0.65 and 0.75 and chlorinated polyvinyl chloride containing about 64 to 68 weight percent chlorine.

15. The method for providing a rigid expanded substantially gel-free vinyl chloride polymer having a density in the range of about 0.38 to 0.95 comprising mixing (1) a high molecular weight vinyl chloride polymer, 5 to 20 weight parts per 100 weight parts of (1) and (2) a copolymer of a styrene containing more than 25% styrene and at least one of an acrylonitrile or an alkyl methacrylate, said styrene copolymer having a dilute solution viscosity greater than 1.5, and a blowing agent consisting essentially of nitrogen releasing chemical blowing agents, substantially free of plasticizers, volatile liquids and solvents and extruding said mixture at a temperature greater than about 350°F. and less than about 450°F.

16. The method of claim 15 including mixing (3) about 5 to 15 weight parts of a polymer containing at least 50% butadiene-1,3, and at least two of a styrene, an acrylonitrile and an alkyl methacrylate, and (2) is a copolymer of styrene containing 15 to 35% acrylonitrile.

* * * * *